United States Patent [19]

Small et al.

[11] 3,772,169

[45] Nov. 13, 1973

[54] OIL COMPOSITIONS

[75] Inventors: Norman J. H. Small, Christleton, near Chester, England; Christopher J. Edhouse, Gresford, near Wrexham, Wales

[73] Assignee: Shell Oil Company, Houston, Tex.

[22] Filed: Feb. 24, 1972

[21] Appl. No.: 229,161

[30] Foreign Application Priority Data
Mar. 5, 1971    Great Britain...................... 6,133/71

[52] U.S. Cl. ................................. 252/56 R, 252/59
[51] Int. Cl. .............................................. C10m 1/28
[58] Field of Search ........................... 252/59, 56 R; 260/31.2 MR

[56] References Cited
UNITED STATES PATENTS

| 3,554,911 | 1/1971 | Schiff et al. | 252/59 |
| 3,679,644 | 7/1972 | Vander Meij et al. | 252/56 R |

*Primary Examiner*—Daniel E. Wyman
*Assistant Examiner*—W. Cannon
*Attorney*—Martin S. Baer et al.

[57] ABSTRACT

The gelling tendency of lubricating oil solutions containing selectively hydrogenated random styrene/butadiene copolymers is minimized by the presence of a polyester of an olefinically unsaturated acid.

7 Claims, No Drawings

OIL COMPOSITIONS

The present invention relates to oil compositions and their preparation.

BACKGROUND OF THE INVENTION

It is known that the viscosity of lubricating oils varies with temperature. The temperature-viscosity relationship of an oil can be expressed by the so-called viscosity index (VI). which can be determined according to the ASTM-D2270 method. The higher the VI of an oil, the less the dependence of its viscosity on temperature. In general, the VI of lubricating oils obtained by conventional processes from mineral oils is not high enough to enable such lubricating oils to meet the very high demands with respect to viscosity made thereon in modern automotive engines. For this reason additives have been proposed, which, when added to a lubricating oil, increase the VI thereof. These additives, which in most cases are polymeric compounds, are called VI improvers.

A particularly suitable kind of VI improver is constituted by the hydrogenated butadiene-styrene copolymers which are random copolymers of butadiene and styrene containing 30–44 percent w of units derived from butadiene and 56–70 percent w of units derived from styrene, which copolymers have been hydrogenated until at least 95 percent of the olefinic double bonds and at most 5 percent of the aromatic unsaturation has been saturated.

In view of the physical nature of such hydrogenated butadienestyrene copolymers and the fact that intensive mixing with the aid of equipment, for example, a Silverson mixer, which provides adequate shearing activity, is necessary in order to dissolve the hydrogenated butadienestyrene copolymers in the oils, it is advantageous to use the master-batch technique for the preparation of the ultimate, improved VI lubricating oils. In this way oil composition concentrates are prepared, and these concentrates are used to prepare lubricating oil compositions containing a desired amount of hydrogenated butadiene-styrene copolymer by blending the concentrate with the required amount of lubricating oil.

Usually such concentrates will contain the maximum amount of hydrogenated butadiene-styrene copolymer which can be so handled, although flow problems with concentrates containing more than about 20–25 percent w of the hydrogenated butadiene-styrene copolymer, even at somewhat elevated temperatures, limit the maximum amount of hydrogenated butadiene-styrene copolymer which can be present in practice in the concentrates. A further handling problem with such concentrates, which contain amount lower than 20 percent w of hydrogenated butadiene-styrene copolymer, e.g., 10 percent w, arises from their tendency to gel on storage. The time needed for the concentrates to gel depends on the temperature of storage and may vary from 2 hours (e.g., on storage at about 50°C) to 2 weeks or longer (e.g., on storage at about 20°C). If gelling occurs, the concentrate cannot easily be removed from the container such as a storage tank, a barrel or a railway tank wagon.

It has now been found in accordance with the present invention that gelling can be avoided or at least signficantly reduced by the incorporation of additional polymer compounds in the concentrates.

According to the present invention there is provided an oil composition which comprises:

1. a lubricating oil,
2. a random copolymer of butadiene and styrene containing 30–44 percent w of units derived from butadiene and 56–70 percent w of units derived from styrene, which copolymer has been hydrogenated until at least 95 percent of the olefinic double bonds and at most 5 percent of the aromatic unsaturation has been saturated, and
3. an oil-soluble polyester which comprises molecular units derived from an alkyl ester of an $\alpha$-olefinically unsaturated carboxylic acid in which the alkyl chain or chains contain(s) at least 7 carbon atoms.

The present invention also includes a lubricating oil formed by admixing an oil composition as just defined with the same or a different lubricating oil.

The random copolymer of butadiene and styrene may be obtained in any known or suitable manner. Thus it may be obtained by copolymerization of butadiene and styrene in emulsion, but preferably the copolymerization is carried out in solution with the aid of an alkali metal or an alkali metal-hydrocarbon, preferably lithium metal or a lithium-hydrocarbon, as a catalyst. Lithium alkyls, such as ethyl lithium, propyl lithium, hexyl lithium and, in particular, sec-butyl lithium, are suitable. The solvent for such solution copolymerization may be a liquid which is inert under the conditions prevailing during the copolymerization, and may be an aliphatic hydrocarbon such as pentane, hexane, cyclohexane or methylcyclohexane or an aromatic hydrocarbon such as benzene, toluene or xylenes. Mixtures of two or more hydrocarbons may also be used. Random copolymers of butadiene and styrene, which do not contain large blocks of one or both of the monomers, are made if a polar compound which does not inactivate the catalyst and which brings about a tendency to random copolymerization is present during the polymerization. Examples of such compounds are tert. amines and ethers, for example, diethylether, dibutylether, anisole, and, in particular, tetrahydrofuran. The amount of polar compound used may lie between wide limits and may range, for instance, from 0.05 to 50 percent w, preferably from 0.1 to 10 percent w, of the total solvent. The copolymerization may be carried out at a temperature between −20° and +80° C and under a pressure which is at least sufficient to maintain the monomers and the solvent in the liquid phase.

The molecular weight of the random copolymer of butadiene and styrene employed, in hydrogenated form, in carrying out the present invention may lie between wide limits; in general a copolymer with a kinetic molecular weight between 40,000 and 100,000 may be used. The hydrogenation of the random copolymers of butadiene and styrene can be carried out with any catalyst, which gives rise to saturation of at least 95 percent of the olefinic double bonds and has a minimum influence on aromatic unsaturation. Examples of such catalyst are catalysts containing a non-noble metal of Group VIII of the Periodic Table or a compound thereof, e.g., Raney nickel, or nickel on kieselguhr. Preference is given to hydrogenation catalysts obtained by reacting an aluminium trialkyl (e.g., aluminium triisobutyl) with a nickel salt of an organic acid (e.g., 2-ethyl hexanoic acid). After removal of solvents and/or other volatile material, the hydrogenated butadiene-styrene copolymers are obtained in the form of solid rubbery materials, which, in order to facilitate their solution in oil, may be reduced to crumb form by mechanical means.

Although the oil-soluble polyester additives used in carrying out the present invention may be derived from the alkyl esters of a-olefinically unsaturated poly- or dicarboxylic acids, such as maleic acid or fumaric acid, it is prefered to employ polyesters derived from the alkyl esters of a-olefinically unsaturated monocarboxylic acids such as acrylic acid and, in particular, methacrylic acid. The alkyl chains of the ester groups may contain up to any desired number of carbon atoms, but in general esters containing from 7 to 24, in particular from 9 to 18, carbon atoms in the alkyl chains are suitable.

It is often of advantage to use oil-soluble polyesters derived from mixtures of said alkylesters of a-olefinically unsaturated carboxylic acids, said mixtures containing esters of different alkyl cahin length. In particular polyesters derived from mixtures of esters containing an average number of carbon atoms in the alkyl chains of from 12 to 15 may be used.

The alkyl chains of said esters may be straight or they may be branched. Esters having straight alkyl chains may be derived from natural alcohols, while those having branched alkyl chains may be derived from synthetic alcohols which may be synthesized, for example, by a reaction of one or more olefins with carbon monoxide and hydrogen in the presence of a catalyst such as a complex catalyst consisting of cobalt, carbon monoxide and optionally a phosphorus compound.

The oil-soluble polyesters may also contain in their molecular structures polymer units derived from monomers other than said alkylesters of $\alpha$-olefinically unstaurated carboxylic acids. For example, such other monomers may be alkyl esters of said acids, which esters have alkyl chains having less than 7 carbon atoms (e.g., methylmethacrylate). or esters of said acids containing polar groups such as hydroxyl groups (e.g., $\beta$-hydroxyethylmethacrylate) or amine groups (such as di-ethyl amino ethylmethacrylate), said acids advantageously being monocarboxylic acids as exemplified.

The oil-soluble polyesters may also contain in their molecular structures polymer units derived from other esters, e.g., vinyl esters, such as vinylacetate, or derived from other types of monomers, such as N-vinylprolidone, 4-vinylpyridine or 2-methyl-5-vinylpyridine.

The oil-soluble polyesters may be prepared in any way desired; for example, polymerization or copolymerization under free radical polymerization conditions is usually suitable. It is also possible to prepared such polyesters indirectly by introducing the required alky chains containing at least 7 carbon atoms into the molecular structures of existing polymers and copolymers. For example, polymers may be prepared containing in the molecule repeating units derived from $\alpha$-olefinically unsaturated carboxylic acids and the carboxylic acid groups thereof may be esterified by reaction with alcohols containing at least 7 carbon atoms in their molecules. The polymers have average molecular weights between about 20,000 and 1 million.

The lubricating oils which can be used in forming oil compositions according to the present invention may be synthetic lubricating oils (e.g., ester oils) or mineral lubricating oils. Since in most cases the oil compositions of the invention will be used to prepare high viscosity index oils based on mineral lubricating oils, it is of advantage in such cases to form the oil compositions from lubricating oils which will constitute the mineral lubricating oil component (or one of such components) of the high V.I. lubricating oil eventually to be prepared.

The amount of hydrogenated random butadiene-styrene copolymer component in an oil composition in accordance with the present invention may be up to 20–25 percent w thereof, and preferably is from 5 to 20 percent w thereof.

The amount of the oil-soluble polyester component of said oil compositions may lie between wide limits. In general, amounts off from 0.05 to 1.0 percent w, in particular from 0.1 to 0.5 percent w thereof, may be employed. Such oil-soluble polyesters can be easily dissolved in mineral or synthetic oils, and may be made available in the form of 30–50 percent w concentrates in such oils.

Oil compositions in accordance with the present invention may be prepared by intimately mixing all components e.g., with the aid of mixing equipment having shearing activity, such as a Silverson mixer. It is also possible, however, to mix a hydrogenated butadiene-styrene copolymer with oil in such equipment, and subsequently to blend the solution obtained with a solution of an oil-soluble polyester in a lubricating oil.

If desired, the oil compositions of the present invention may also comprise compounds which are required in the ultimate lubricating oils, such as detergent additives, (e.g., calcium petroleum sulphonates, calcium salts of alkylsalicylic acids, polyamines containing a hydrocarbon chain with at least 50 carbon atoms, such as polyisobutenyl-tetraethylenepentamine), extreme pressure (E.P.) additives (e.g., zinc dialkyl dithiophosphates) and others.

The ultimate lubricating oil compositions suitable to be used in engines can be prepared from the oil compositions according to the invention by admixing with a lubricating oil, and if desired addition of additives, such as those mentioned in the preceding paragraph.

The present invention may be illustrated by the following example:

EXAMPLE

A hydrogenated random copolymer of butadiene and styrene, which contained 59 percent w of styrene and which polymer was practically free of olefinic unsaturation, was dissolved in a HVI 60 oil with the aid of a Silverson mixer to a concentration of 10 percent w.

The resulting solution was blended with solutions in lubricating oil of two different polyester additives viz. a polyalkylmethacrylate with alkyl chains with at least 9 carbon atoms and an average of 14 carbon atoms per alkyl chain (additive A) and a copolymer of laurylmethacrylate, stearylmethacrylate and and $\beta$-hydroxyethylemethacrylate in a molar ratio 8 : 2 : 1.8 (additive B), to give three oil compositions in accordance with the present invention containing 0.2 and 0.4 percent w of additive A and 0.2 percent w of additive B, respectively.

The oil solution containing only the hydrogenated random copolymer of butadiene and styrene and the oil compositions containing the additives A and B were stored at 50°C for various periods. The following table shows that all the compositions in accordance with the present invention remained free flowing after two days.

The compositions containing 0.2 percent w of the additives A and B partly gelled after some time, but that the composition containing 0.4 percent of the additive A was free flowing even after 3 weeks.

TABLE

| Time of inspection after blending | 2 days | 1 week | 2 weeks | 3 weeks |
|---|---|---|---|---|
| Solution of gelled random copolymer | | gelled | gelled | gelled |
| solution of + 0.2% additive A | free flowing | partially gelled | partially gelled | partially gelled |
| Solution of + 0.2% additive B | free flowing | partially gelled | partially gelled | partially gelled |
| Solution of + 0.4% additive A | free flowing | free flowing | free flowing | free flowing |

We claim:
1. An oil composition which comprises a major amount of a lubricating oil,
   b. a normally gelling amount of 5-25 percent by weight of a random copolymer of butadiene and styrene containing 30-44 percent w of units derived from butadiene and 56-70 percent w of units derived from styrene, which copolymer has been hydrogenated until at least 95 percent of the olefinic double bonds and at most 5 percent of the aromatic unsaturation has been saturated, and
   c. 0.05 to 1.0 percent by weight of an oil-soluble polyester which comprises molecular units derived from an alkyl ester of an acrylic acid in which the alkyl chain or chains contain(s) at least 7 carbon atoms, said polyester having an average molecular weight between about 20,000 and one million.

2. An oil composition according to claim 1 in which the kinetic molecular weight of the random copolymer is between 40,000 and 100,000.

3. An oil composition according to claim 1 in which the acid is methacrylic acid.

4. An oil composition according to claim 1 in which the alkyl chains in the polyester contain from 9 to 18 carbon atoms.

5. An oil composition according to claim 1 in which the polyester is derived from mixtures of esters containing an average number of carbon atoms in the alkyl chains of from 12 to 15.

6. An oil composition according to claim 1 in which the amount of hydrogenated random butadiene-styrene copolymer is from 5 to 20 percent w thereof.

7. An oil composition according to claim 1 in which the amount of oil-soluble polyester is from 0.1 to 0.5 percent w thereof.

* * * * *